United States Patent
Cornett

[19]

[11] Patent Number: 5,908,890
[45] Date of Patent: Jun. 1, 1999

[54] ANTIBLOCK AGENT FOR POLYOLEFIN FILMS

[75] Inventor: Arlen C. Cornett, Evergreen, Colo.

[73] Assignee: CR Minerals Corporation, Golden, Colo.

[21] Appl. No.: 08/908,797

[22] Filed: Aug. 8, 1997

[51] Int. Cl.$^6$ ................................ C08J 5/10; C08K 3/34; C08L 23/00
[52] U.S. Cl. ......................... 524/448; 524/444; 524/445; 524/447
[58] Field of Search ..................................... 524/492, 493, 524/494, 430, 431, 433, 445, 448, 442, 444, 446

[56] References Cited

U.S. PATENT DOCUMENTS

| | | | |
|---|---|---|---|
| 3,755,238 | 8/1973 | Wiita | 260/29.6 XA |
| 3,803,065 | 4/1974 | Arai et al. | 260/23 H |
| 4,110,500 | 8/1978 | Evans et al. | 428/35 |
| 4,112,158 | 9/1978 | Creekmore et al. | 428/35 |
| 4,124,550 | 11/1978 | Kobayashi et al. | 260/23.3 |
| 4,957,970 | 9/1990 | Holsapple et al. | 525/99 |
| 5,262,228 | 11/1993 | Kohyama et al. | 428/220 |
| 5,292,366 | 3/1994 | Miceli | 106/708 |
| 5,358,785 | 10/1994 | Akao et al. | 428/349 |
| 5,492,741 | 2/1996 | Akao et al. | 428/35.2 |
| 5,536,773 | 7/1996 | Yamada et al. | 524/499 |

FOREIGN PATENT DOCUMENTS

| | | |
|---|---|---|
| 2157732 | of 1973 | France . |
| 2233289 | 9/1971 | Germany . |
| 55-154139 | 12/1980 | Japan . |
| 56-27336 | 3/1981 | Japan . |

Primary Examiner—James J. Seidleck
Assistant Examiner—U. K. Rajguru
Attorney, Agent, or Firm—Burns, Doane, Swecker & Mathis, L.L.P.

[57] ABSTRACT

The invention relates to the production and use of an agent for use in polymers as an antiblock agent. Pumice with very low amounts of crystalline silica is processed from pumice stone to produce a fine ground pumice with a narrow particle size range. When incorporated into a polyolefin film, the fine ground pumice acts as an antiblock agent while not significantly contributing to haze.

6 Claims, 8 Drawing Sheets

ANTIBLOCK AGENT FOR POLYOLEFIN FILMS

BACKGROUND OF THE INVENTION

1. Field of the Invention

The invention relates to an agent for use in polymers as an antiblock agent. The invention further relates to a polymer composition containing an antiblock agent and a polymer film containing the antiblock agent.

2. Description of the Related Art

Various minerals have in the past been used to give antiblock properties to polyolefin films. The first large application for the use of polymeric films was in the food wrap industries, and for enclosing various materials in a transparent film for retail sales. Polyvinylchloride (PVC) resins were the first large volume materials used in these markets. PVC has a natural non-tacky property when produced as a film and does not require a material to provide an antiblock function. Such PVC films are still the material of choice for fresh food wrap, e.g., meat wrap, today. When polyethylene was developed, it was found to have more strength than and similar clarity to PVC when produced in a film. Polyethylene has, however, inherent tack. To address this problem and accelerate the use of polyethylene in packaging films and other thin-walled uses, e.g., bags, it was found that an antiblock or anti-tack agent (a mineral) would mechanically break up the film's natural smoothness, and thus reduce the ability of the film to stick to itself, i.e., the mineral agent acts as an antiblock agent.

Polyolefin films were originally made from low density polyethylene (LDPE) and high density polyethylene (HDPE) resins. As technology advanced, linear-low density polyethylene (LLDPE) was introduced for use in producing films. LLDPE has a higher strength than the prior materials, enabling thinner films to be produced for use in the same applications as LDPE. More recently, metallocene catalyst polyethylene resin systems have been developed for clearer films and more elastomeric properties than the prior polyethylene resins.

Polypropylene resins are also now used for films which require a very high degree of strength. Polypropylene has good clarity when produced as a film, but requires the use of expensive synthetic silica as an antiblock agent.

In the initial work with antiblock agents for polyethylene films, it was discovered that calcined diatomaceous earth of fine particle size (3.5 to 12 microns) worked very well as an antiblock agent. Calcined diatomaceous earth has continued to be used for this purpose for the last 35 to 40 years. Calcined diatomaceous earth contains a minimum of 63% crystalline silica and has irregularly shaped particles. The high levels of the crystalline silica in calcined diatomaceous earth have prompted a reduction of its use as an antiblock agent in polyolefin films from nearly 100% of the market to approximately 15–20% today, for reasons discussed in greater detail below.

Calcium carbonate has also been used as an antiblock agent for polyethylene films. Calcium carbonate has the advantage of being inexpensive. Calcium carbonate has the disadvantages of requiring an amount for effective antiblocking that is two to three times more than most other antiblock agents, which decreases the transparency of the resultant film. Films incorporating calcium carbonate as an antiblock agent vary in transparency from merely hazy to completely opaque. Calcium carbonate is therefore typically used as an antiblock agent for polyolefin films where clarity is not an issue, and opaque or colored films are acceptable. Calcium carbonate has irregularly shaped particles.

Microcrystalline silica has also been used as an antiblock agent. Silica had been used as an antiblock agent up until it was discovered that crystalline silica presents severe health hazards as a carcinogen. Microcrystalline silica has irregularly shaped particles and contains up to 98% crystalline silica. This ground sand or quartz also has high hardness which causes extreme metal wear in the equipment used to process the material.

In 1996, the World Health Organization—International Agency For Research on Cancer (IARC) issued a report (Silica and Some Silicates, IARC Monographs On The Evaluation Of The Carcinogenic Risk Of Chemicals To Humans, Vol. 42, 1997) identifying crystalline silica in respirable form as a Class 2A "probable human carcinogen." In late 1996, IARC announced the impending official change in that classification to Class 1, "human carcinogen." The designation of respirable crystalline silica as a human carcinogen presented severe problems with the use and incorporation of crystalline silica and crystalline silica-containing products, e.g., minerals, as antiblock agents in polyolefin films. Because Occupational Safety and Health Administration (OSHA) standards now severely restrict the amount of exposure that one can have to respirable crystalline silica, the use of antiblock agents which have high levels of respirable crystalline silica has been understandably greatly reduced.

Talc has also been used as an antiblock agent in polyolefin films. Talc has the benefit of requiring less material than calcium carbonate for the same level of antiblocking, and produces considerably less haze in the resultant film than calcium carbonate. However, the use of talc as an antiblock agent in polyolefin films requires special handling equipment to be able to process the talc for use as an antiblock agent, which increases overall costs. Talc has particles with a plate-shaped structure. Despite these failings, talc is now the most widely used mineral antiblock agent for LDPE and LLDPE films.

Nephylene syenite is also used as an antiblock agent in polyolefin films, despite its relative scarcity. Nephylene syenite includes no appreciable amount of quartz or crystalline silica, but has a very high hardness and is, consequently, extremely abrasive on processing and handling equipment. Nephylene syenite has a refractive index near that of polyethylene, which makes it very useful despite its relative scarcity. Currently, nephylene syenite is used in approximately ten percent of polyolefin film production applications.

Polymer producers add antiblock agents to the polymer in two different ways, near the end of the production chain. The most common way is to add the mineral and other additives "neat," i.e., mixing the antiblock agent in the appropriate percentage directly into the molten polymer as it is being produced.

A second method for adding antiblock to a polymer is to add a concentrate of the agent into the polymer. A concentrate is normally a blend of the antiblock agent and some polymer. Usually the concentrate ranges from 10% to 75% (by weight) antiblock agent, with the balance being polymer and other additives, if any. To prepare the concentrate, antiblock agent is added to an amount of the polymer so as to obtain the desired concentration of antiblock agent in polymer. The polymer is then extruded, cooled, and pelletized or granulated to form a concentrate.

Antiblock agents generally function in two ways. Antiblock agents may be present as a dusting on the surface of a film to prevent contact of the film to itself or other surfaces, thus preventing mutual adhesion. Examples of the use of an antiblock agent in such a manner include talc on surgical gloves. A second way of using an antiblock agent with a film is by intimately dispersing the agent in the polymer before the polymer is formed into the film. The antiblock agent particles extend beyond the outer surface of the polymer, thereby disturbing the planarity of the polymer film surface, thus preventing the surfaces of the film from fully contacting itself or another surface.

The amount that a polymer film blocks, i.e., that it adheres to itself or another surface, is quantifiable. One method of quantifying the blocking characteristics of a film is by measuring the coefficient of friction of the surface of the film using a standardized method. One such method is ASTM D 1894-95, Standard Test Method for Static and Kinetic Coefficients of Friction of Plastic Film and Sheeting, incorporated by reference herein in its entirety. Another method of quantifying the blocking characteristics of a film is by directly measuring the blocking load of a film. One such method is ASTM D 3354-89, Standard Test Method for Blocking Load of Plastic Film by Parallel Plate Method, incorporated by reference herein in its entirety.

In the past, pumice has been used as a filler in polymers. Typically, filler weight percentages in a bulk polymer are very high, resulting in extreme haze or opacity of the resultant polymer. For example, filler weight percentages range from about 10% to about 50%. Pumice is added to polymer matrices as a filler for a number of reasons, among them being to improve impact strength, tear strength, tensile strength, and increase stiffness. Furthermore, when used as a filler, pumice typically has a particle size of 200 microns or greater. For example, U.S. Pat. No. 5,536,773 (Yamada et al.), U.S. Pat. No. 5,492,741 (Akao et al.), U.S. Pat. No. 5,358,785 (Akao et al.), U.S. Pat. No. 5,262,288 (Kohyama et al.), and U.S. Pat. No. 4,124,550 (Kobayashi et al.) describe the use of pumice in polymers as a filler or as a light-shielding additive.

In contrast, minerals and other agents used as antiblock agents in polymer films are typically used in extremely small amounts, e.g., less than or equal to 1% of the polymer bulk material by weight.

Pumice has also in the past been used as an abrasive product, e.g., in abrasive soaps, etc., and polishing compounds. Pumice used in these applications is typically very coarse, includes particles over a very wide range of sizes, is used in extremely high concentrations or weight percentages, and varies considerably in both color (although it is typically yellow) and refractive index.

The composition of minerals, such as pumice, may be determined using a number of techniques. The composition of the mineral may be determined using an inductively coupled plasma (ICP) device, or by more conventional X-ray diffraction techniques. Thus, the level of crystallinity of a mineral, e.g., pumice, may be investigated and determined.

The clarity of a polyolefin film is extremely important in many applications. For example, in the food packaging industry, polyolefin films having high clarity are extremely desirable, so that the contents of a package may be readily inspected without disrupting the seal provided by the film around the product. The clarity of a film is typically quantified in terms of the amount of haze, measured using standard methods. One such method is ASTM D 1003-95, Standard Test Method for Haze and Luminous Transmittance of Transparent Plastics, incorporated by reference herein in its entirety.

Accordingly, there remains a need for an antiblock agent which achieves high clarity when incorporated into polymer, e.g., polyolefin, films, while being economically feasible, readily available, which produces very low haze when incorporated into a film, which does not present the health and safety concerns of prior antiblock agents, and yet provides antiblock properties superior to prior antiblock agents.

SUMMARY OF THE INVENTION

According to the present invention, fine pumice is used as an antiblock agent in polyolefin films, for example, in HDPE, LDPE, LLDPE, polypropylene, metallocene catalyst based polymers, etc. The pumice of the invention has the advantages of being an amorphous compound which does not present a health hazard because of high levels of crystalline silica, of having a high efficiency as an antiblock agent in polyolefin films, and of exhibiting a refractive index very close to the polyolefin films in which it can be used, resulting in a low contribution to haze and higher clarity. Fine pumice according to the present invention contains less than 1% by weight, preferably less than 0.5% by weight, crystalline silica, thereby offering health and safety advantages over calcined diatomaceous earth products, and provides high levels of clarity in the resultant polyolefin films.

According to one aspect of the present invention, a fine pumice useful as an antiblock agent in polymer films comprises pumice having a particle size from about 0.01 to about 100 microns and having a refractive index of about 1.50.

According to another aspect of the present invention, a polymer useful in producing polymer films comprises a polyolefin matrix and pumice having a refractive index of about 1.50 dispersed in the matrix.

According to yet another aspect of the present invention, a polymer useful in producing polymer films comprises a polyolefin matrix and pumice dispersed in the matrix having a particle size from about 0.01 to about 100 microns.

According to yet another aspect of the present invention, a polymer useful in producing polymer films comprises a polyolefin matrix and fine pumice dispersed in the matrix, the pumice being in a concentration of less than about 1 percent by weight.

According to yet another aspect of the present invention, a polymer film comprises a polyolefin matrix formed into a film, and an antiblock agent in the matrix comprising pumice which contains less than about 1 percent by weight crystalline silica.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

The pumice used in the present invention is derived from pumice stone, a naturally occurring product of volcanic origin. The pumice stone comprises a mixture of various oxides, predominantly of silicon, aluminum, iron, sodium, and potassium. Table 1 lists the most prevalent (by weight percent) components of a typical pumice stone which is used as the starting material for producing the pumice used in the present invention. Substantially all of the oxides are chemically bound to silicon dioxide as silicates.

TABLE 1

| $SiO_2$ | $Al_2O_3$ | $Fe_2O_3$ | MgO | CaO | $Na_2O$ | $K_2O$ |
|---|---|---|---|---|---|---|
| 73.79 | 11.62 | 1.79 | 0.06 | 0.26 | 4.24 | 4.22 |
| $P_2O_5$ | $TiO_2$ | MnO | BaO | $Cr_2O_3$ | SrO | — |
| 0.028 | 0.057 | 0.075 | 0.002 | 0.006 | <0.001 | — |

Unbound silicon dioxide in the mined pumice stone contains less than about 1% (by weight) crystalline silica. Accordingly, the fine pumice produced from the pumice stone also contains less than 1% (by weight), preferably less than 0.5% (by weight), of crystalline silica, therefore allowing its use in a wide variety of applications without the possibility of excessive exposure to harmful respirable crystalline silica. The pumice has a refractive index of about 1.50.

The concentration of crystalline silica contained in the fine pumice is determined using any method for determining the composition of a mineral, as would be readily apparent to one of ordinary skill in the art, including X-ray diffraction and ICP techniques. For example, a standard X-ray diffraction technique can be used to determine the concentration of crystalline silica in the fine pumice of the present invention, as follows. A sample is ground to a fine powder, mixed with calcium fluoride ($CaF_2$) as an internal standard, ground further, and backloaded into a standard X-ray diffraction (XRD) holder. The sample is scanned using standard run parameters on a Philips XRD unit, equipped with graphite monochromatized radiation. The angular range from 4 to 64 degrees is scanned. The peak positions and intensities from these runs are tabulated and used to identify the phases present. The weight percent of silica is calculated through the use of the internal standard and calibration coefficients derived from standard NBS-1878 quartz, NIOSH/IITRI CB 25 cristobalite, and NIOSH/IITRI TY27 tridymite mixed with $CaF_2$.

Figure 1:
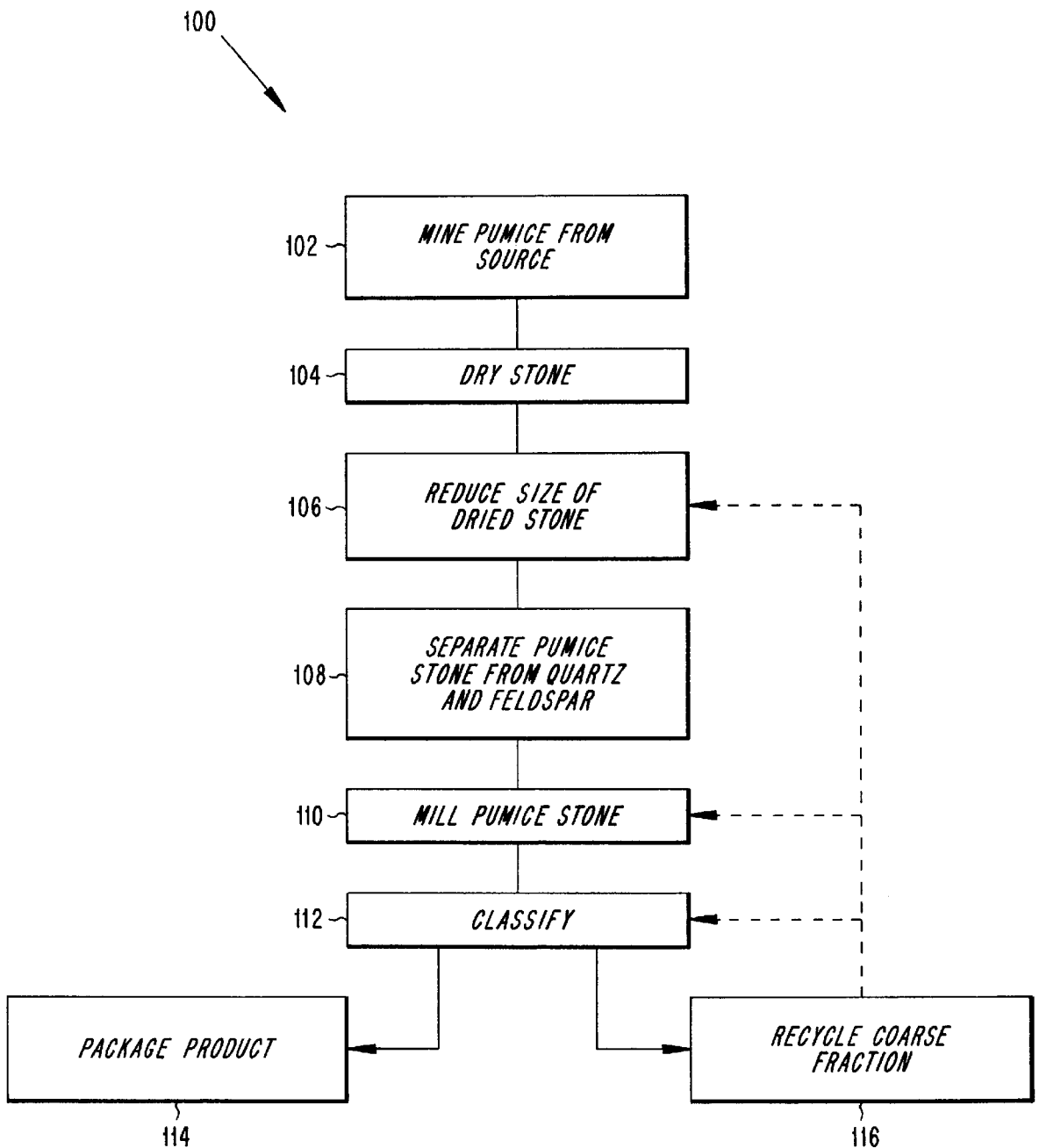
FIG. 1 illustrates a schematic flow chart of a process for producing fine ground pumice according to the present invention.

FIG. 1 illustrates a schematic flow chart of a process 100 for producing fine pumice according to the present invention. Pumice stone is mined from a source at step 102. Other naturally occurring products of volcanic origin can be used as the starting material to produce an antiblock agent of the present invention. Volcanic glass, pumacite, and obsidian may be used, as long as the product which is produced by the process of the present invention has a refractive index of about 1.50 and a color substantially the same as the fine pumice of the present invention when pumice stone is used as the starting material. The pumice stone is then dried at step 104 to remove moisture, i.e., water. Drying step 104 may be performed by any of various available dryers, including rotary, belt, tray, and apron dryers, as will be readily appreciated by one of ordinary skill in the art. Preferably, a tray dryer performs step 104. The dried pumice stone preferably contains less than 1% (by weight) moisture.

The dried pumice stone is then reduced in size at step 106. Reducing step 106 may be performed by either crushing or grinding the dried pumice stone from drying step 104. During the crushing or grinding step 106, the crusher or grinder is chosen to produce large particles in the most efficient particle size for further processing. Various types of crushers can be used in reducing step 106, as would be readily apparent to one of ordinary skill in the art, such as a Pennsylvania Crusher. The variable speed of the crusher can be changed to control the size of the particles produced.

The reduced pumice stone then passes to a separation step 108. During the separation step 108, the heavier quartz and feldspar particles separate out from the pumice particles. Various types of separation equipment may be used in separation step 108, as will be readily apparent to one of ordinary skill in the art. Preferably, a fluidized, bed-type gravity table is used to air-classify and separate the reduced pumice stone from the quartz and feldspar. Because quartz and feldspar both contain very high concentrations of silica, separation of these two impurities from the reduced pumice stone reduces the concentration of silica in the separated pumice stone. Thus, a fine pumice according to the present invention contains reduced concentrations of quartz and feldspar, thus lowering the weight percent of crystalline silica in the fine pumice final product of the present invention. Specifically, quartz and feldspar together make up less than 1% (by weight), and preferably less then 0.5% (by weight), of the separated pumice stone.

The choice of the particular crusher or grinder used, and the mean particle size of the particles produced, in reducing step 106 is guided by the output from separation step 108, because the heaver quartz and feldspar particles are separated from the pumice stone in step 108. The equipment used in reducing step 106 is chosen and controlled to produce reduced pumice stone which, when further processed in separating step 108, results in a separated pumice stone containing less than 1% (by weight), and preferably less than 0.5% (by weight), crystalline silica, as measured by any method for determining the composition of the separated pumice stone, including the X-ray diffraction technique described above.

From the separation step 108, the pumice particles pass to milling step 110. Preferably, a Williams roller mill, hammer mill, or fluidized jetmill is used to mill the separated pumice particles to a desired size. A variable speed drive control on the mill is preferably provided to allow close control over the resultant particle size. The milled pumice stone has a particle size between about 0.01 to about 100 micron, and a mean particle size between about 2 to about 70 microns.

From milling step 110, the milled pumice particles pass to an air classifying step 112. In the air classifying step, the processing speed and grinding tolerance are adjusted to produce an end product size with a low standard deviation from the mean. The air classified pumice stone has a particle size between about 0.01 to about 100 micron, and the mean particle size is preferably selected between about 2.5 to about 20 microns. The size of the particles can be measured by any particle size analyzer as will be readily apparent to one of ordinary skill in the art, and preferably a Mastersizer $\mu$+Version 2.15 (Malvern Instruments, Ltd., Malvern, UK), as described in greater detail below.

The microsized pumice is then packaged in step 114. A coarse fraction of the pumice milled in step 110 is oversized, and is therefore rejected in microsizing step 112. This coarse fraction is then recycled in step 116, passing back to one of the prior steps. Preferably, the coarse fraction is recycled to one or more of reducing step 106, milling step 110, and classifying step 112, or may be packaged as a separate product.

Preferably, fine pumice according to the present invention is incorporated as an antiblock agent in a polyolefin film at about less than 1% by weight, preferably less than about 0.5% by weight, and more preferably less than about 0.1% by weight, of the resultant polymer material. A fine pumice antiblock agent according to the present invention can be incorporated into polymer matrices "neat" or in a concentrate. Other suitable processes for incorporating a fine pumice antiblock agent into polymer matrices will be readily apparent to one of ordinary skill in the art.

Figure 2:
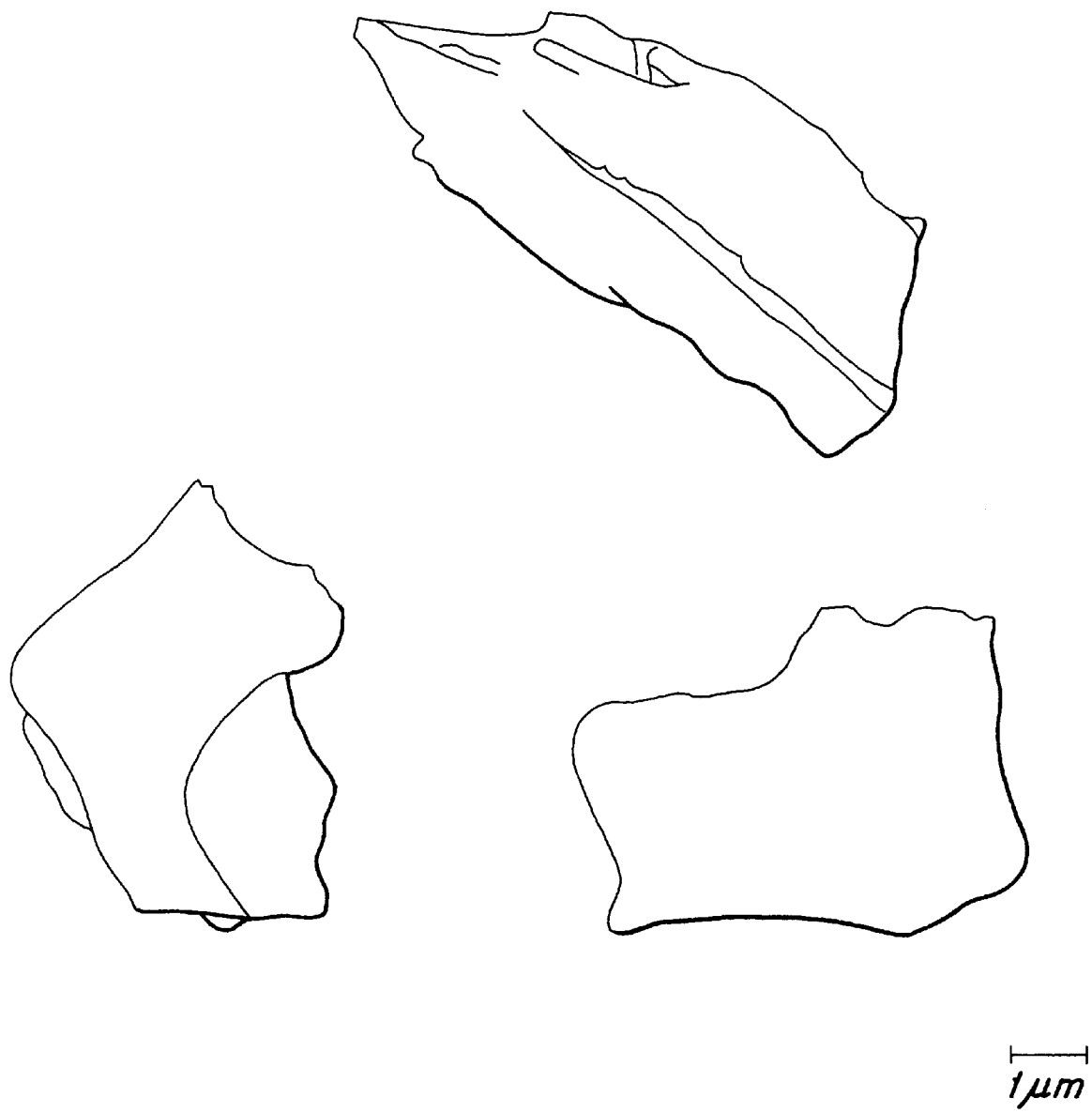
FIG. 2 is an illustration of a fine pumice according to the present invention.

FIG. 2 is an illustration of fine pumice particles produced in accordance with the present invention. The particles of the fine pumice according to the invention vary somewhat in shape, from needle-like to a shape similar to a narrow polyhedron. When incorporated into a polymer, e.g., polyolefin, film matrix, the fine pumice particles act to disrupt the otherwise relatively smooth surfaces of the film, producing a rough or spiny surface, thus preventing intimate contact between a film surface and itself or other surfaces.

As demonstrated in FIG. 3 through FIG. 11, a fine pumice according to the present invention contributes less haze, and provides superior antiblock properties than prior art antiblock agents when incorporated into a polymer, e.g., polyolefin, matrix. Polymers in which a fine pumice antiblock agent according to the present invention can be used include, but are not limited to, HDPE, LDPE, LLDPE, polypropylene, metallocene catalyst based polymers, and any other polymers that are used to produce polymer film. Other polymers in which a fine pumice antiblock agent according to the present invention can be used will be readily apparent to one of ordinary skill in the art.

Polymer films incorporating a fine pumice antiblock agent according to the present invention can be produced by any process used to produce polymer films, and may be formed into a wide range of thicknesses. For instance, the polymer films can be prepared by extrusion, blow molding, compression molding, casting, flame spraying, and rotomolding. The film is preferably prepared by an extrusion process, resulting in a film having a thickness ranging between about 0.1 and about 125 mils.

Figure 3:
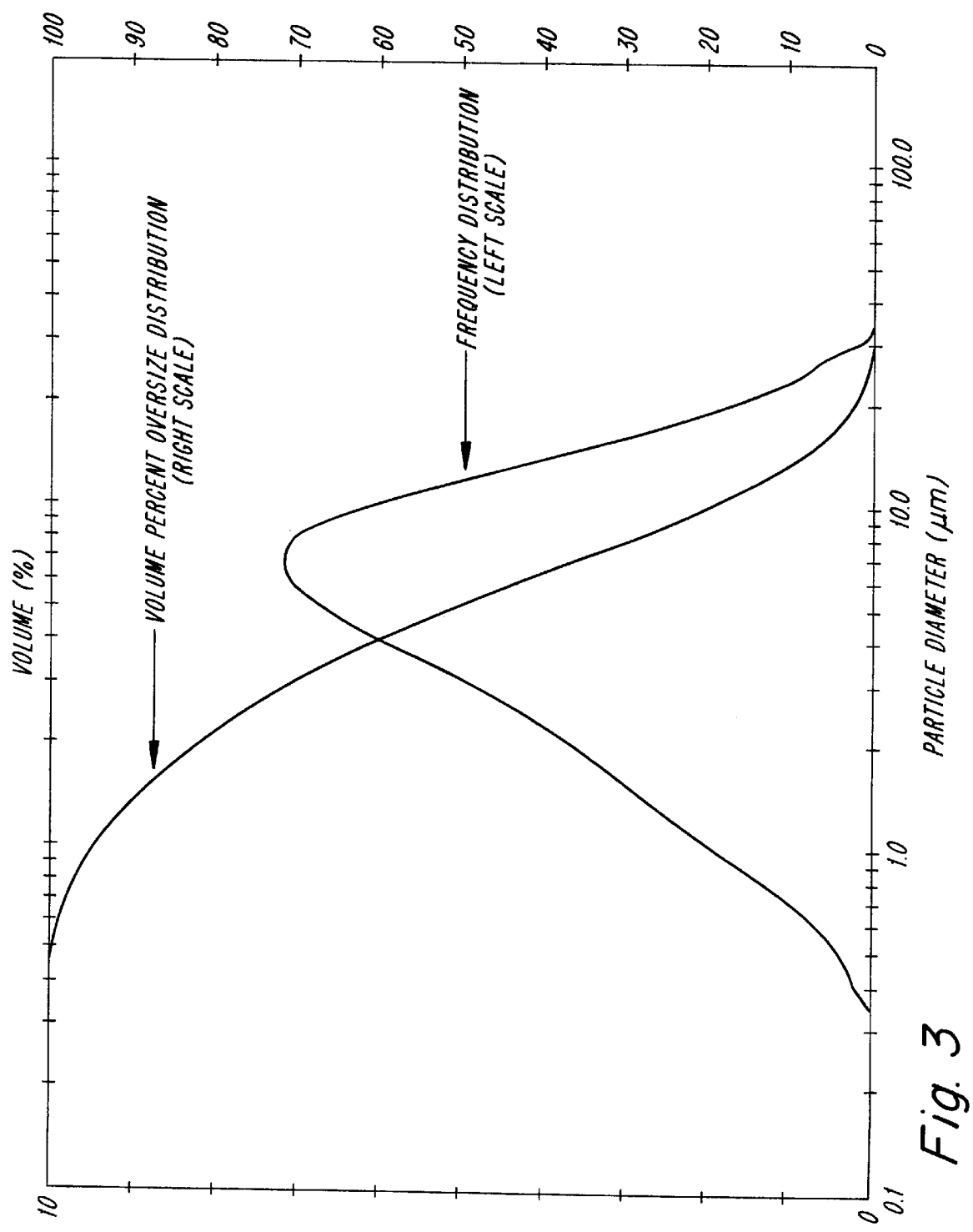
FIG. 3 illustrates a graphical representation of a statistical distribution of particle sizes of a fine pumice according to the present invention.
Figure 4:
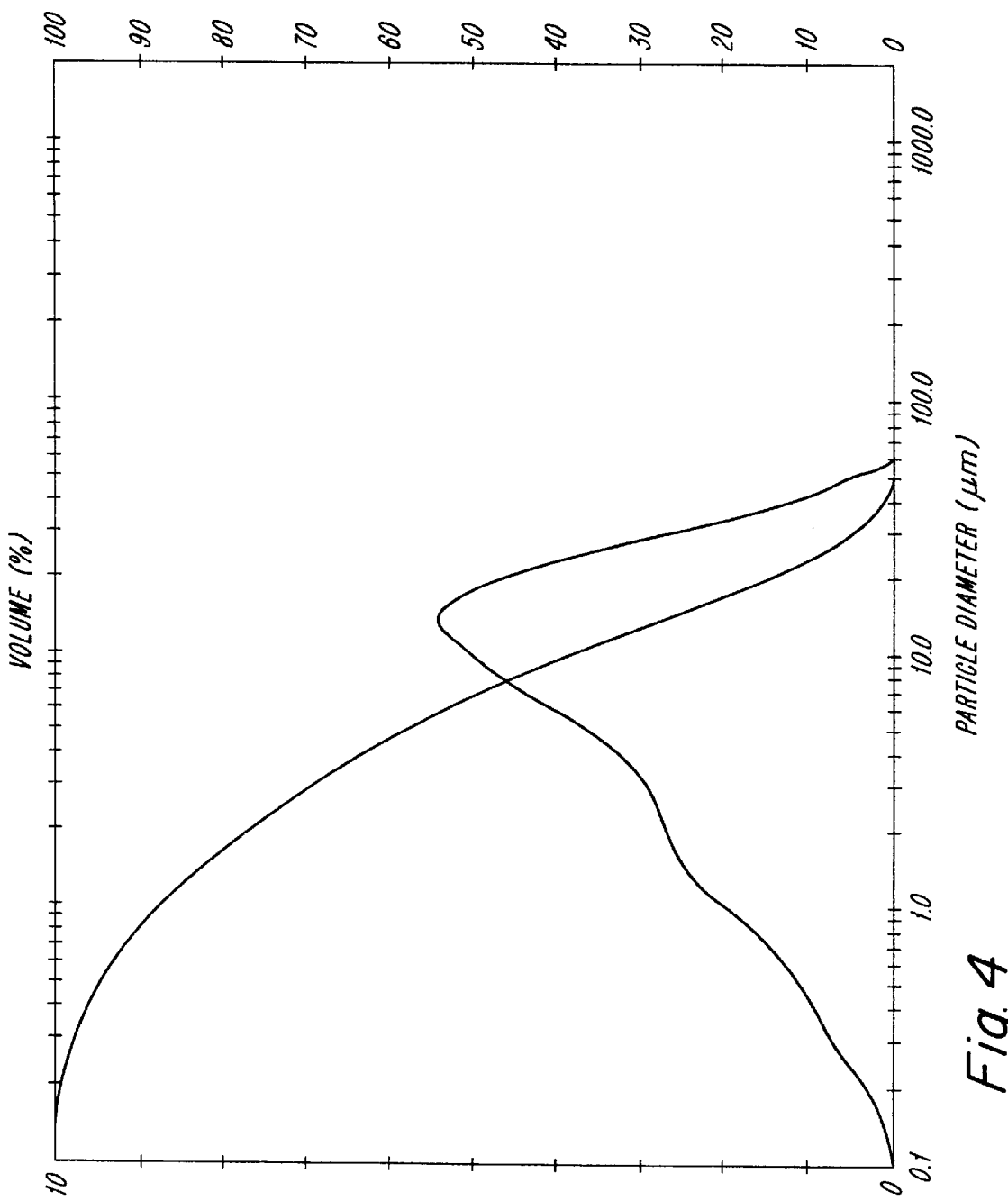
FIG. 4 illustrates a graphical representation of a statistical distribution of particle sizes of a prior art nephylene syenite antiblock agent.
Figure 5:
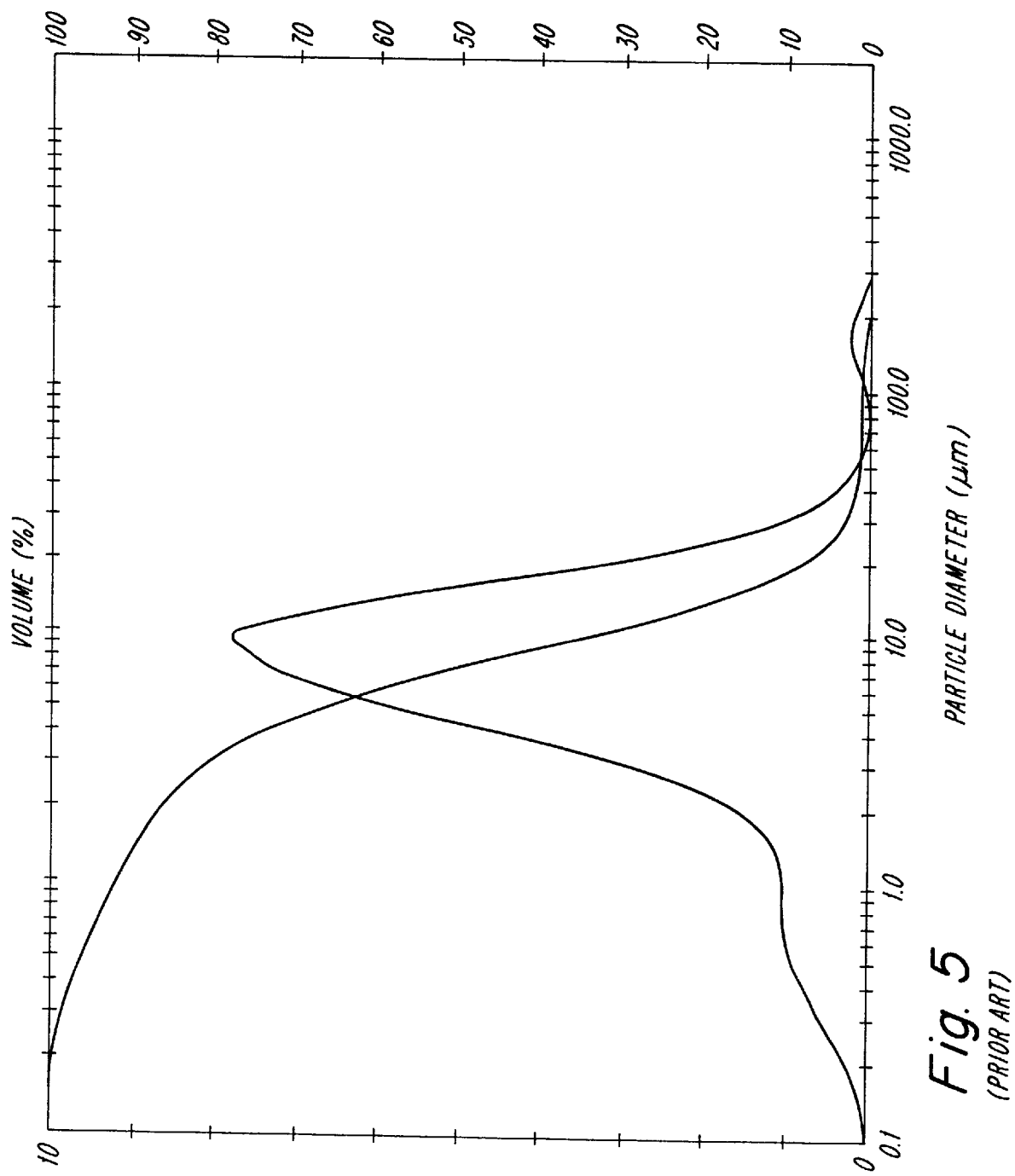
FIG. 5 illustrates a graphical representation of a statistical distribution of particle sizes of a prior art calcined diatomaceous earth antiblock agent.

FIG. 3 illustrates a graphical representation of a statistical distribution of particle sizes of a fine pumice according to the present invention. FIGS. 4 and 5 illustrate graphical representations of statistical distributions of particle sizes of nephylene syenite (N.S.) and calcined diatomaceous earth (C.D.E.), two prior art antiblock agents. In FIGS. 3–5, the frequency distribution illustrates the average percentage of the size of the sample particles; the peak of the frequency curve is the most commonly occurring particle diameter for the sample. Calcined diatomaceous earth is available under the trade name WHITE MIST from World Minerals. Nephylene syenite is available under the trade name MINEX from Unimin Corporation.

Table 2 tabulates several statistics about the particle size distributions illustrated in FIGS. 3–5, as analyzed using a Mastersizer $\mu$+Version 2.15 (Malvern Instruments, Ltd., Malvern, UK), which uses laser diffraction techniques to analyze particle size. The data presented in Table 2 is volume based and expressed in terms of equivalent spheres. In Table 2, Presentation, Analysis Model, Particle R.I. (refractive index), Imaginary Particle R.I. (refractive index), Dispersant R.I. (refractive index), and Density are values provided by the user to the Mastersizer instrument and act as constraints on the particle size analysis. Presentation and Analysis Model are selected from menus of choices on the Mastersizer. Particle R.I., Imaginary Particle R.I., and Dispersant R.I. are also selected from menus of choices, and the particular values are selected to be the closest among all the choices in the menus to the actual values for the refractive index of the particles and of the dispersant. The values for Particle R.I., Imaginary Particle R.I., and Dispersant R.I. are, however, reflected in the Presentation code, and their indication in Table 2 is therefore redundant with the particular code selected for Presentation. The dispersant used for obtaining the data presented in Table 2 is water, which has a refractive index of 1.3300. Density is the density of the particle material.

The remaining values in Table 2 are data output by the Mastersizer. Measured Beam Obscuration is a measure of the concentration of the particles in the dispersant. Concentration is also a measure of the concentration of the particles in the dispersant (water), expressed as a volume percent. Residual is a statistical value which indicates the level of the lack of fit of the output data to the measured particle size distribution curve, expressed as a percent of the particles which fall outside of the range of the data. Specific S.A. (surface area) is the total surface area of the sample of particles divided by the total mass of the sample of particles.

The first three values given for Mean Diameter are based on the volume percent sampled, and are expressed in $\mu$m. D (v,0.1), D(v,0.5), and D (v,0.9) are the mean particle diameters of the particles which are at the tenth, fiftieth (the median), and ninetieth percentiles, respectively, i.e., ten, fifty, and ninety percent of the entire sample, respectively, have particle diameters smaller than the particles the means diameters of which are presented for D (v,0.1), D(v,0.5), and D (v,0.9). D (4,3) is the average particle size of the sample, based on the diameters of the particles. D (3,2) is the average particle size of the sample, based on the area of the particles. Span is an indicator of how wide the particle size distribution curve is, and is (automatically) calculated by the formula (D(v,0.9)–D(v,0.1))/D(v,0.5) by the Mastersizer unit.

Uniformity is a measure of the absolute deviation of particle size from the mean, also automatically calculated by the Mastersizer unit.

As can be readily appreciated from FIG. 3, an exemplary sample of one grade of a fine pumice according to the present invention has a mean particle size between about 2.5 to about 20 microns, and preferably ranges in size from about 0.01 to about 100 microns, preferably from about 2 to about 70 microns. About 80% by volume of the sample of fine pumice according to the present invention measures 2 microns or greater; 20% of the sample measures 10 microns or greater.

TABLE 2

| Value | FIG. 3: Invention | FIG. 4: N.S. | FIG. 5: C.D.E. |
|---|---|---|---|
| Presentation | 5 OJD | 5 OHD | 5 OHD |
| Analysis Model | Polydisperse | Polydisperse | Polydisperse |
| Particle R.I., Imaginary Particle R.I. | 1.5295, 1.000 | 1.5295, 0.1000 | 1.5295, 0.1000 |
| Dispersant R.I. | 1.3300 | 1.3300 | 1.3300 |
| Density (g/cm$^3$) | 2.400 | 2.610 | 2.260 |
| Measured Beam Obscuration (%) | 22.6 | 26.4 | 30.2 |
| Concentration (% Vol.) | 0.0117 | 0.0158 | 0.0230 |
| Residual (%) | 0.654 | 0.583 | 0.430 |
| Specific S.A. (m$^2$/g) | 0.7935 | 1.2909 | 0.9932 |
| Mean Diameters, D | — | — | — |
| D (v,0.1) ($\mu$m) | 1.37 | .83 | 1.25 |
| D (v,0.5) ($\mu$m) | 5.19 | 6.89 | 7.25 |
| D (v,0.9) ($\mu$m) | 13.52 | 23.89 | 18.67 |
| D (4,3) ($\mu$m) | 6.52 | 10.00 | 10.79 |
| D (3,2) ($\mu$m) | 3.15 | 2.11 | 2.75 |
| Span | 2.342 | 3.347 | 2.401 |
| Uniformity | 0.7331 | 1.064 | 0.9819 |

As noted above, FIG. 4 illustrates a graphical representation of a statistical distribution of particle sizes of nephylene syenite, a prior art antiblock agent. The nephylene syenite particle sizes vary substantially over a range of about 0.1 $\mu$m to about 60 $\mu$m, around a particle size mean of about 17 $\mu$m.

FIG. 5 illustrates a graphical representation of a statistical distribution of particle sizes of calcined diatomaceous earth, a prior art antiblock agent. The calcined diatomaceous earth particle sizes vary substantially over a range of about 0.1 $\mu$m to about 300 $\mu$m, around a first peak at about 10 $\mu$m and a second peak at about 180 $\mu$m.

The nature and arrangement of atoms and ions of the particles of fine pumice according to the present invention determines its refractive index. The refractive index of a material may be measured by a number of methods. One such method is Polarized Light Microscopy (PLM), although other methods may be used, as will be readily apparent to one of ordinary skill in the art. Measuring the refractive index of a mineral by PLM includes forming the mineral and an index oil into grain mounds until the index oil matches the dominant particle type in the mineral.

A specialized, particular process or processes for producing the fine ground pumice according to the present invention have been developed, such that the fine pumice retains its refractive index, which is approximately that of many polymers in which it is desirable to incorporate an antiblock agent. Such a process is discussed in greater detail, above. Preferably, the refractive index of fine pumice according to the present invention is about 1.50, as measured by a PLM technique. Pumice stone which has a composition similar to that in Table 1, above, has a blue-grey color, which is indicative of a starting material pumice stone which will produce a fine pumice with a refractive index of approximately 1.50. When incorporated into a polymer matrix having a refractive index very close to that of the fine pumice of the invention, very little haze is generated in the polymer, resulting in a clearer polymer product, e.g., film.

Figure 6:
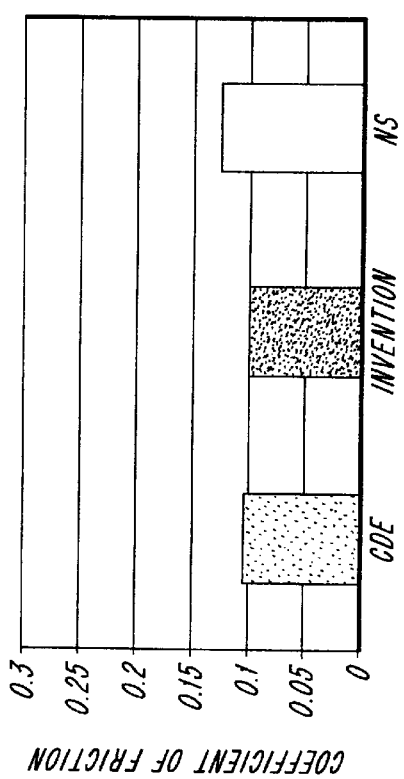
FIG. 6 illustrates a graphical comparison of the coefficients of friction of a fine pumice according to the present invention, a prior art nephylene syenite, and a prior art calcined diatomaceous earth, each incorporated into a polyolefin matrix.

FIG. 6 illustrates a graphical comparison of the coefficients of friction of a fine pumice according to the present invention (labeled "Invention"), a prior art nephylene syenite (labeled "NS"), and a prior art calcined diatomaceous earth (labeled "CDE"), incorporated at 5000 ppm into a metallocene catalyst based polymer matrix (AFFINITY PL 1880 resin, available from Dow Chemical) and formed into films. The films were formed using a laboratory extruder and film producing equipment to a thickness of about 2 mils. The nephylene syenite and calcined diatomaceous earth particles used in this comparison had particle size distributions substantially the same as those illustrated in FIGS. 4 and 5.

The coefficient of friction of each of the films was measured according to ASTM D 1894-95, Standard Test Method for Static and Kinetic Coefficients of Friction of Plastic Film and Sheeting. As can be readily appreciated from FIG. 6, a film incorporating a fine pumice according to the present invention at 5000 ppm has a coefficient of friction of about 0.1, which is significantly less than the two prior art antiblock agents. Accordingly, a fine pumice in accordance with the present invention possesses antiblock properties superior to the prior art antiblock agents, as measured by their respective coefficients of friction.

Figure 7:
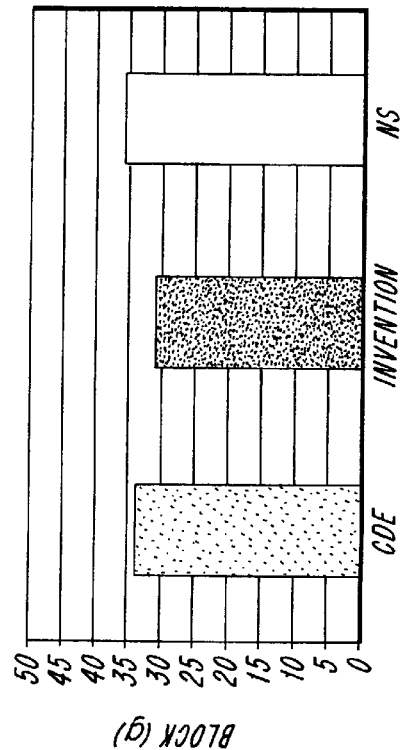
FIG. 7 illustrates a graphical comparison of the blocking forces of a fine pumice according to the present invention, a prior art nephylene syenite, and a prior art calcined diatomaceous earth, each incorporated into a polyolefin matrix.

FIG. 7 illustrates a graphical comparison of the blocking forces of a fine pumice according to the present invention (labeled "Invention"), a prior art nephylene syenite (labeled "NS"), and a prior art calcined diatomaceous earth (labeled "CDE"), incorporated at 5000 ppm into a metallocene catalyst based polymer matrix (AFFINITY PL 1880 resin) and formed into films. The films were formed using a laboratory extruder and film producing equipment to a thickness of about 2 mils. The nephylene syenite and calcined diatomaceous earth particles used in this comparison had particle size distributions substantially the same as those illustrated in FIGS. 4 and 5.

The blocking forces for each film were then measured according to ASTM D 3354-89, Standard Test Method for Blocking Load of Plastic Film by Parallel Plate Method. As can be readily appreciated from FIG. 7, a film incorporating a fine pumice according to the present invention generates blocking force(s) of about 31 gm, which is substantially less than the prior art antiblock agents. Accordingly, a fine pumice in accordance with the present invention possesses antiblock properties superior to the prior art antiblock agents, as measured by their respective blocking forces.

Figure 8:
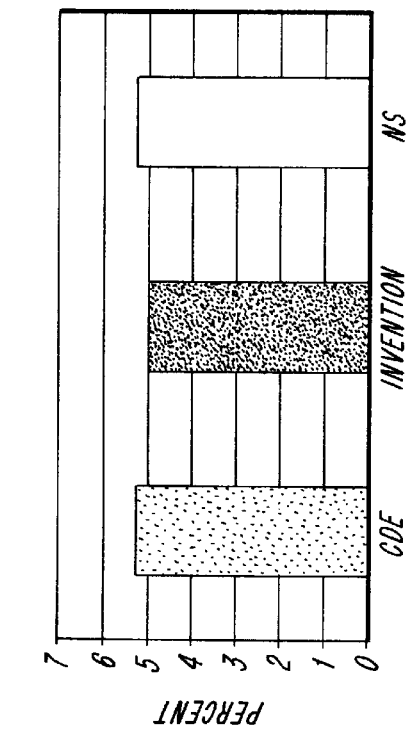
FIG. 8 illustrates a graphical comparison of the percent haze of a fine pumice according to the present invention, a prior art nephylene syenite, and a prior art calcined diatomaceous earth, each incorporated into a polyolefin matrix.

FIG. 8 illustrates a graphical comparison of the percent haze of a fine pumice according to the present invention (labeled "Invention"), a prior art nephylene syenite (labeled "NS"), and a prior art calcined diatomaceous earth (labeled "CDE"), incorporated at 5000 ppm into a metallocene catalyst based polymer matrix (AFFINITY PL 1880 resin) and formed into films. The films were formed using a laboratory extruder and film producing equipment to a thickness of about 2 mils. The nephylene syenite and calcined diatomaceous earth particles used in this comparison had particle size distributions substantially the same as those illustrated in FIGS. 4 and 5.

The haze in each film was measured according to ASTM D 1003-95, Standard Test Method for Haze and Luminous Transmittance of Transparent Plastics. As can be readily appreciated from FIG. 8, a fine pumice according to the present invention contributes about 5% haze to a film when incorporated at 5000 ppm therein, which is substantially less than the prior art antiblock agents. Accordingly, a fine pumice in accordance with the present invention is superior to the prior art antiblock agents in haze contribution, i.e, clarity.

Figure 9:
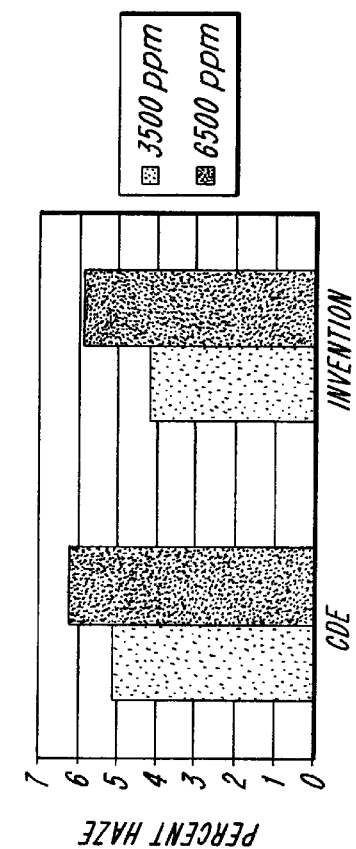
FIG. 9 illustrates a graphical comparison of the percent haze of a fine pumice according to the present invention and a prior art calcined diatomaceous earth, each incorporated into a metallocene catalyst based polymer matrix at two different concentrations.

FIG. 9 illustrates a graphical comparison of the percent haze of a fine pumice according to the present invention and a prior art calcined diatomaceous earth (labeled "CDE"), incorporated into a metallocene catalyst based polymer matrix (AFFINITY PL 1880 resin) and formed into films, at two different concentrations. The films were formed using a laboratory extruder and film producing equipment to a thickness of about 2 mils. Both antiblock agents were incorporated into the polymer matrices at 3500 ppm and 6500 ppm. The calcined diatomaceous earth particles used in this comparison had particle size distributions substantially the same as those illustrated in FIG. 5.

The percent haze in each film was measured according to ASTM D 1003-95, Standard Test Method for Haze and Luminous Transmittance of Transparent Plastics. As can be readily appreciated from FIG. 9, a fine pumice according to the present invention contributes less haze to a polyolefin film than an equal amount of calcined diatomaceous earth. Accordingly, FIG. 9 further illustrates that a fine pumice in accordance with the present invention is superior to the prior art antiblock agents in haze contribution, i.e., clarity.

Table 3 summarizes the results of yet another comparison of the haze contribution of a fine pumice according to the present invention with two commercially available grades of calcined diatomaceous earth. Five batches of fine pumice according to the present invention were prepared according to the process described above. Samples of each of the batches of fine pumice, and the calcined diatomaceous earth, were then separately added to a low density metallocene catalyst based polymer matrix (AFFINITY PF 1140 resin, Dow Chemical) at two different concentrations, and formed into films. The films were formed using a laboratory extruder and film producing equipment to a thickness of about 1.3 mils. The calcined diatomaceous earth particles used as "C.D.E.1" in this comparison had a particle size distribution substantially the same as those illustrated in FIG. 5. The calcined diatomaceous earth particles used as "C.D.E.2" in this comparison are available under the trade name Super Floss, from World Minerals.

The percent haze in each film was measured according to ASTM D 1003-95, Standard Test Method for Haze and Luminous Transmittance of Transparent Plastics, and those values averaged for the five samples of fine pumice. As can be readily appreciated from Table 3, a fine pumice according to the present invention contributes less haze to a polyolefin film than an equal amount of calcined diatomaceous earth. Accordingly, Table 3 further illustrates that a fine pumice in accordance with the present invention is superior to the prior art antiblock agents in haze contribution, i.e., clarity.

TABLE 3

| Attribute | Invention | | C.D.E.1 | | C.D.E.2 | |
| --- | --- | --- | --- | --- | --- | --- |
| Concentration, ppm | 3500 | 6500 | 3500 | 6500 | 3500 | 6500 |
| Average Haze % | 3.8 | 5.5 | 5.5 | 7.5 | 4.7 | 8.0 |
| % Difference from Invention | — | — | +30.9 | +26.7 | +19.0 | +31.3 |

Figure 10:
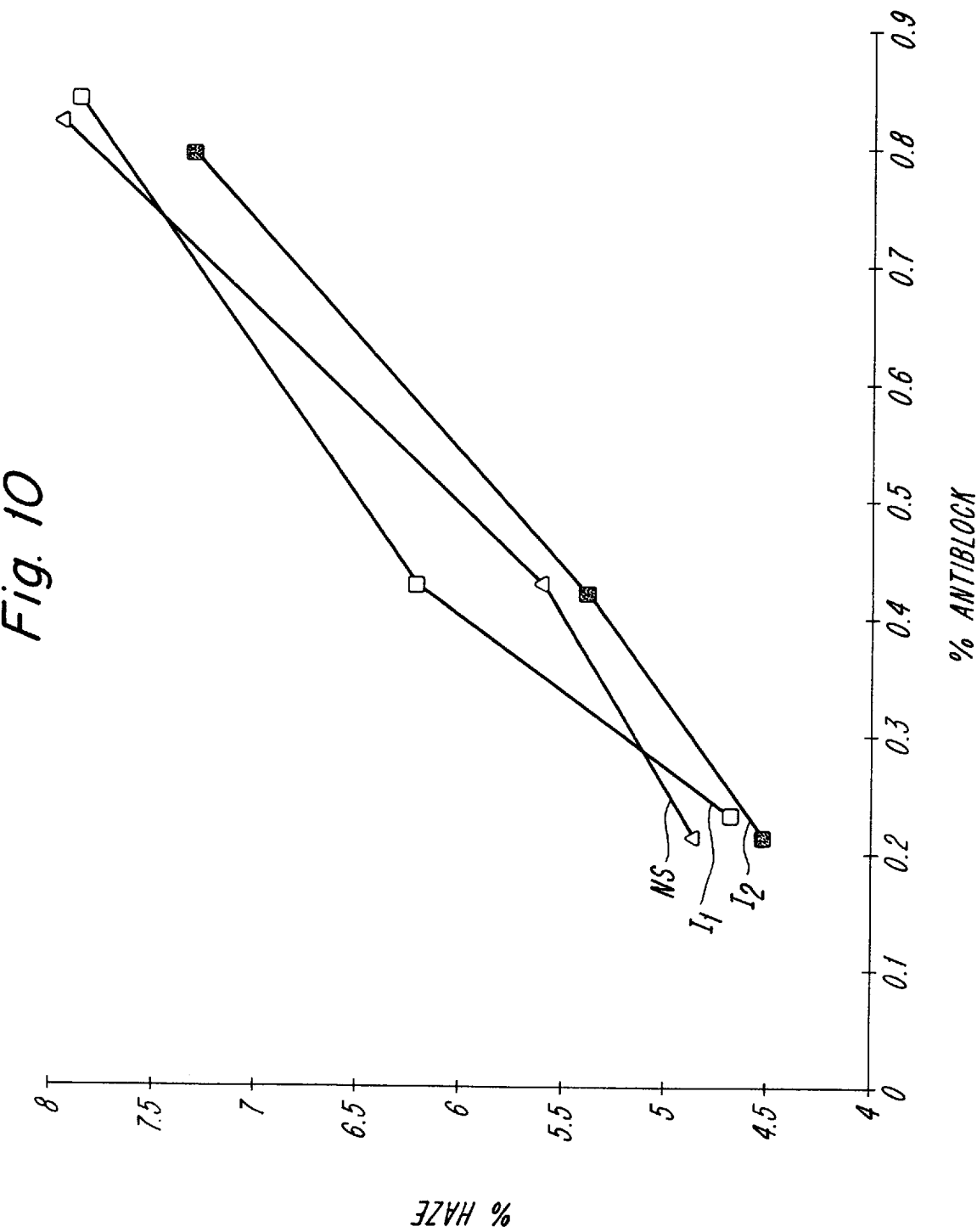
FIG. 10 illustrates a graphical comparison of the percent haze versus percent antiblock agent for two polymer matrices incorporating two samples of a fine pumice according to the present invention and a polymer matrix incorporating a prior art nephylene syenite antiblock agent.

FIG. 10 illustrates a graphical comparison of the percent haze versus percent antiblock agent for two LLDPE matrix films incorporating two different samples of a fine pumice according to the present invention (labeled "$I_1$" and "$I_2$") and a LLDPE matrix film incorporating a prior art nephylene syenite antiblock agent (labeled "NS"). The films were formed using a laboratory extruder and film producing equipment to a thickness of about 2 mils. The nephylene syenite particles used in this comparison had particle size distributions substantially the same as those illustrated in FIG. 4.

The percent haze of the films was measured according to ASTM D 1003-95, Standard Test Method for Haze and Luminous Transmittance of Transparent Plastics. As can be readily appreciated from FIG. 10, a fine pumice according to the present invention contributes less haze than the prior art nephylene syenite antiblock agent over a wide range of weight percentages of the antiblock agent.

Figure 11:
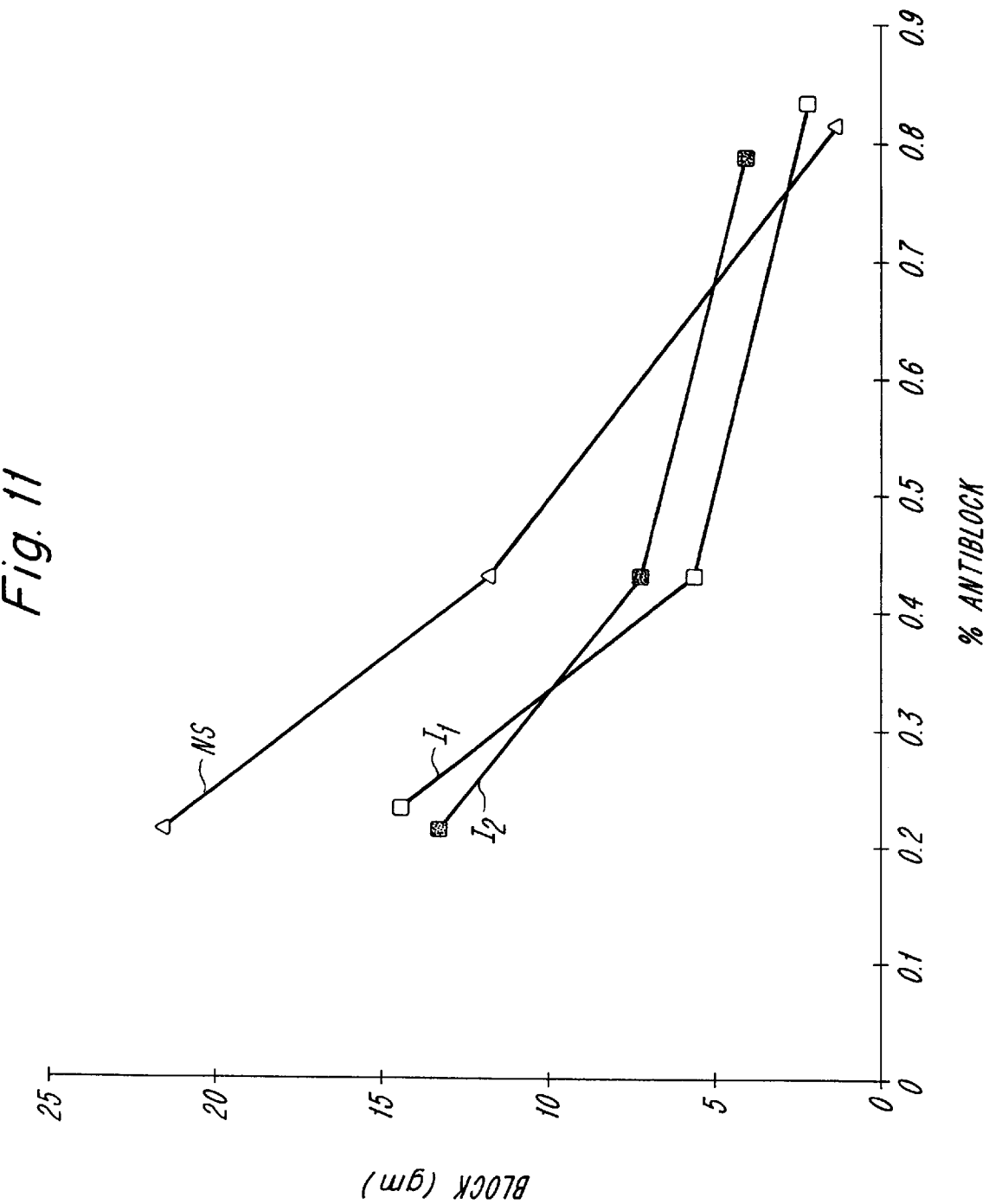
FIG. 11 illustrates a graphical comparison of the blocking force versus percent antiblock agent for two polymer matrices incorporating two samples of a fine pumice according to the present invention and a polymer matrix incorporating a prior art nephylene syenite antiblock agent.

FIG. 11 illustrates a graphical comparison of the blocking force versus percent antiblock agent for two LLDPE matrix films incorporating two different samples of a fine pumice according to the present invention (labeled "$I_1$" and "$I_2$") and a LLDPE matrix film incorporating a prior art nephylene syenite antiblock agent (labeled "NS"). The films were formed using a laboratory extruder and film producing equipment to a thickness of about 2 mils. The nephylene syenite particles used in this comparison had particle size distributions substantially the same as those illustrated in FIG. 4.

The blocking force for each of the films was measured according to ASTM D 3354-89, Standard Test Method for Blocking Load of Plastic Film by Parallel Plate Method. As can be readily appreciated from FIG. 11, a fine pumice according to the present invention generates substantially less blocking force than the prior art nephylene syenite antiblock agent over a significant portion of the range of weight percentages of the antiblock agent.

Table 4 tabulates the data used to generate the illustrations contained in FIGS. 10 and 11. In Table 4, Density is the density of the polymer, including any additives, expressed in gm/cc. Melt index is the mass of polymer, including additives, that will melt in 10 minutes, expressed in gm/10 minutes. Antiblock content is the weight percentage of the antiblock agent used in each film. Slip content is the amount of slip agent in the films, expressed in parts-per-million. Haze is the haze value measured as described above, expressed in percent. Gloss is a unitless measure of the surface gloss of the films. F-50 Mean is the force needed to separate two identical films from each other, normalized for film thickness, expressed in gm/mil. Mean COF is the mean coefficient of friction of the films, expressed in gm/gm, as measured according to ASTM D 1894-95, Standard Test Method for Static and Kinetic Coefficients of Friction of Plastic Film and Sheeting. Mean net block force is the mean block force measured according to ASTM D 3354-89, Standard Test Method for Blocking Load of Plastic Film by Parallel Plate Method, as described above, expressed in grams. Mean net 50° C. block force is the mean blocking force between two identical films, i.e., the force needed to separate the two films, measured at 50° C. and expressed in grams. Mean net 30° C. block force is the mean blocking force between two identical films, i.e., the force needed to separate the two films, measured at 30° C. and expressed in grams.

TABLE 4

| Attribute | Units | $I_{1,1}$ | $I_{1,2}$ | $I_{1,3}$ | $I_{2,1}$ | $I_{2,2}$ | $I_{2,3}$ |
|---|---|---|---|---|---|---|---|
| Density | gm/cc | 0.9255 | 0.9268 | 0.9292 | 0.9256 | 0.9268 | 0.9289 |
| Melt Index | gm/10 min | 1.777 | 1.83 | 1.816 | 1.846 | 1.807 | 1.801 |
| Antiblock Content | wt. % | 0.232 | 0.429 | 0.836 | 0.213 | 0.424 | 0.791 |
| Slip Content | ppm | 599 | 613.5 | 581.5 | 583.5 | 569 | 570 |
| Haze | % | 4.67 | 6.23 | 7.893 | 4.52 | 5.4 | 7.323 |
| Gloss | — | 126.0 | 119.4 | 112 | 128.5 | 123.4 | 115.9 |
| F-50 Mean | gm/mil | 48.4 | 38.8 | 49.783 | 47.25 | 44.318 | 46.25 |
| Mean COF | gm/gm | 0.081 | 0.079 | 0.094 | 0.086 | 0.076 | 0.073 |
| Mean net block force | gm | 14.42 | 5.5 | 2.1 | 13.16 | 7.4 | 4.04 |
| Mean net 50° C. block force | gm | 23.48 | 14.8 | 3.84 | 36.26 | 15.12 | 4.12 |
| Mean net 30° C. block force | gm | 1.34 | 0.74 | 1.44 | 1.56 | −0.2 | 0.62 |

While the invention has been described in detail with reference to preferred embodiments thereof, it will be apparent to one skilled in the art that various changes can be made, and equivalents employed, without departing from the scope of the invention.

What is claimed is:

1. A polymer film comprising:

a polyolefin matrix formed into a film; and an antiblock agent in said matrix comprising pumice which contains less than about 1 percent by weight crystalline silica wherein said pumice is in a concentration less than about 1 percent by weight.

2. A polymer film according to claim 1, wherein said pumice is in a concentration less than about 0.5 percent by weight.

3. A polymer film according to claim 2, wherein said pumice is in a concentration less than about 0.1 percent by weight.

4. A polymer film according to claim 1, wherein said film has a coefficient of friction of about 0.1 or less at a concentration of fine pumice of about 5000 parts per million, when measured by ASTM D 1894-95.

5. A polymer film according to claim 1, wherein said film generates a block force of about 31 grams or less at a concentration of fine pumice of about 5000 parts per million, when measured by ASTM D 3354-89.

6. A polymer film according to claim 1, wherein said film has about 5 percent haze or less at a concentration of fine pumice of about 5000 parts per million, when measured by ASTM D 1003-95.

* * * * *